(12) United States Patent
Ankeney et al.

(10) Patent No.: US 8,508,092 B2
(45) Date of Patent: Aug. 13, 2013

(54) PERMANENT MAGNET ROTORS AND METHODS OF MANUFACTURING THE SAME

(75) Inventors: Scott Michael Ankeney, Ann Arbor, MI (US); Kenji Nakamura, Toyota (JP)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 265 days.

(21) Appl. No.: 12/950,517

(22) Filed: Nov. 19, 2010

(65) Prior Publication Data

US 2012/0126637 A1  May 24, 2012

(51) Int. Cl.
*H02K 21/12* (2006.01)

(52) U.S. Cl.
USPC .................................................. 310/156.33

(58) Field of Classification Search
USPC .................... 310/156.31, 156.36, 156.57
See application file for complete search history.

(56) References Cited

U.S. PATENT DOCUMENTS

| | | | |
|---|---|---|---|
| 4,973,872 A | 11/1990 | Dohogne | |
| 5,488,260 A | 1/1996 | Heyraud | |
| 5,684,352 A | 11/1997 | Mita et al. | |
| 6,232,685 B1 | 5/2001 | Swetish et al. | |
| 6,868,778 B2 | 3/2005 | Knoth et al. | |
| 7,148,598 B2 | 12/2006 | Ionel et al. | |
| 7,155,804 B2 | 1/2007 | Calico | |
| 7,455,509 B2 | 11/2008 | Knoth et al. | |
| 7,851,958 B2 * | 12/2010 | Cai et al. .................. | 310/156.53 |
| 2003/0051614 A1 | 3/2003 | Knoth et al. | |
| 2003/0062792 A1* | 4/2003 | Reiter et al. ............. | 310/156.56 |
| 2005/0001499 A1 | 1/2005 | Calico | |
| 2005/0057114 A1 | 3/2005 | Calico | |
| 2005/0201885 A1 | 9/2005 | Knoth et al. | |
| 2006/0006754 A1 | 1/2006 | Calico | |
| 2006/0170301 A1 | 8/2006 | Masuzawa et al. | |
| 2009/0045688 A1 | 2/2009 | Liang et al. | |
| 2010/0117475 A1 | 5/2010 | Leonardi et al. | |
| 2010/0237736 A1 | 9/2010 | Alfermann et al. | |

FOREIGN PATENT DOCUMENTS

| | | |
|---|---|---|
| JP | 07075296 A | 3/1995 |
| JP | 2008182824 A | 8/2008 |

OTHER PUBLICATIONS

Chelluri, et al. "Powder Forming Using Dynamic Magnetic Compaction," 4th International Conference on High Speed Forming—2010, IAP Research, Inc., Dayton, Ohio, pp. 26-34.

* cited by examiner

*Primary Examiner* — Nguyen N Hanh
(74) *Attorney, Agent, or Firm* — Dinsmore & Shohl LLP

(57) ABSTRACT

A rotor for an electrical motor includes a spindle, a plurality of sintered permanent magnets arranged around the spindle, a compacted powdered soft magnetic material at least partially surrounding the plurality of sintered permanent magnets, and a plurality of discrete regions of compacted powdered non-magnetic material at least partially surrounding the plurality of sintered permanent magnets. The discrete regions of non-magnetic material are at least partially embedded in the soft magnetic material and the soft magnetic material and the non-magnetic material couple the plurality of sintered permanent magnets with the spindle.

18 Claims, 7 Drawing Sheets

NON-INVENTIVE EXAMPLE

PERMANENT MAGNET ROTORS AND METHODS OF MANUFACTURING THE SAME

TECHNICAL FIELD

The present specification generally relates to rotors for electric motors and, more specifically, to permanent magnet rotors for electric motors.

BACKGROUND

In permanent magnet electric motors, there is a desire to increase the utilization of magnetic flux produced by the permanent magnets. Improved utilization of the magnetic flux may provide improved torque of the electric motor using the same voltage and current. One way to increase the magnetic flux of a permanent magnet rotor is to decrease flux leakage through the bridge portion of the rotor, or the area between the permanent magnet and the outer diameter of the rotor.

Previous methods of manufacturing rotors having permanent magnets involved using thin laminates of soft magnetic material. Portions of the laminate were cut out so that when the laminates were assembled, the permanent magnets could be inserted through these cut out portions. The use of laminates required that a single material be used to form the support portion of the rotor. Magnetic flux could leak through the bridge material of the laminate.

Accordingly, a need exists for alternative permanent magnet rotors and methods of manufacturing the same.

SUMMARY

In one embodiment, a rotor for an electrical motor includes a spindle, a plurality of sintered permanent magnets arranged around the spindle, a compacted powdered soft magnetic material at least partially surrounding the plurality of sintered permanent magnets, and a plurality of discrete regions of compacted powdered non-magnetic material at least partially surrounding the plurality of sintered permanent magnets. The discrete regions of non-magnetic material are at least partially embedded in the soft magnetic material and the soft magnetic material and the non-magnetic material couple the plurality of sintered permanent magnets with the spindle.

In another embodiment, an alternating current synchronous electric motor includes a stator that includes a plurality of windings, a rotor arranged to rotate within an interior of the stator, the rotor including a spindle, a plurality of sintered permanent magnets arranged around the spindle, a compacted powdered soft magnetic material at least partially surrounding the plurality of sintered permanent magnets, and a plurality of discrete regions of compacted powdered non-magnetic material at least partially surrounding the plurality of sintered permanent magnets, where the soft magnetic material and the non-magnetic material couple the plurality of sintered permanent magnets with the spindle. The plurality of sintered permanent magnets create a plurality of localized magnetic fields that interact with an alternating electrical current that passes through the plurality of windings of the stator.

In yet another embodiment, a method of forming a rotor for an electric motor includes positioning a spindle into a frame, positioning a plurality of sintered permanent magnets into the frame, loading a first material including a powdered soft magnetic material into the frame such that the first material at least partially surrounds the plurality of sintered permanent magnets, and loading a second material including a powdered non-magnetic material into the frame such that the second material at least partially surrounds the plurality of sintered permanent magnets. The method further includes compacting the first material and the second material such that the powdered non-magnetic material forms a plurality of discrete regions of non-magnetic material, and the plurality of sintered permanent magnets, the powdered soft magnetic material, and the powdered non-magnetic material form an integral rotor.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
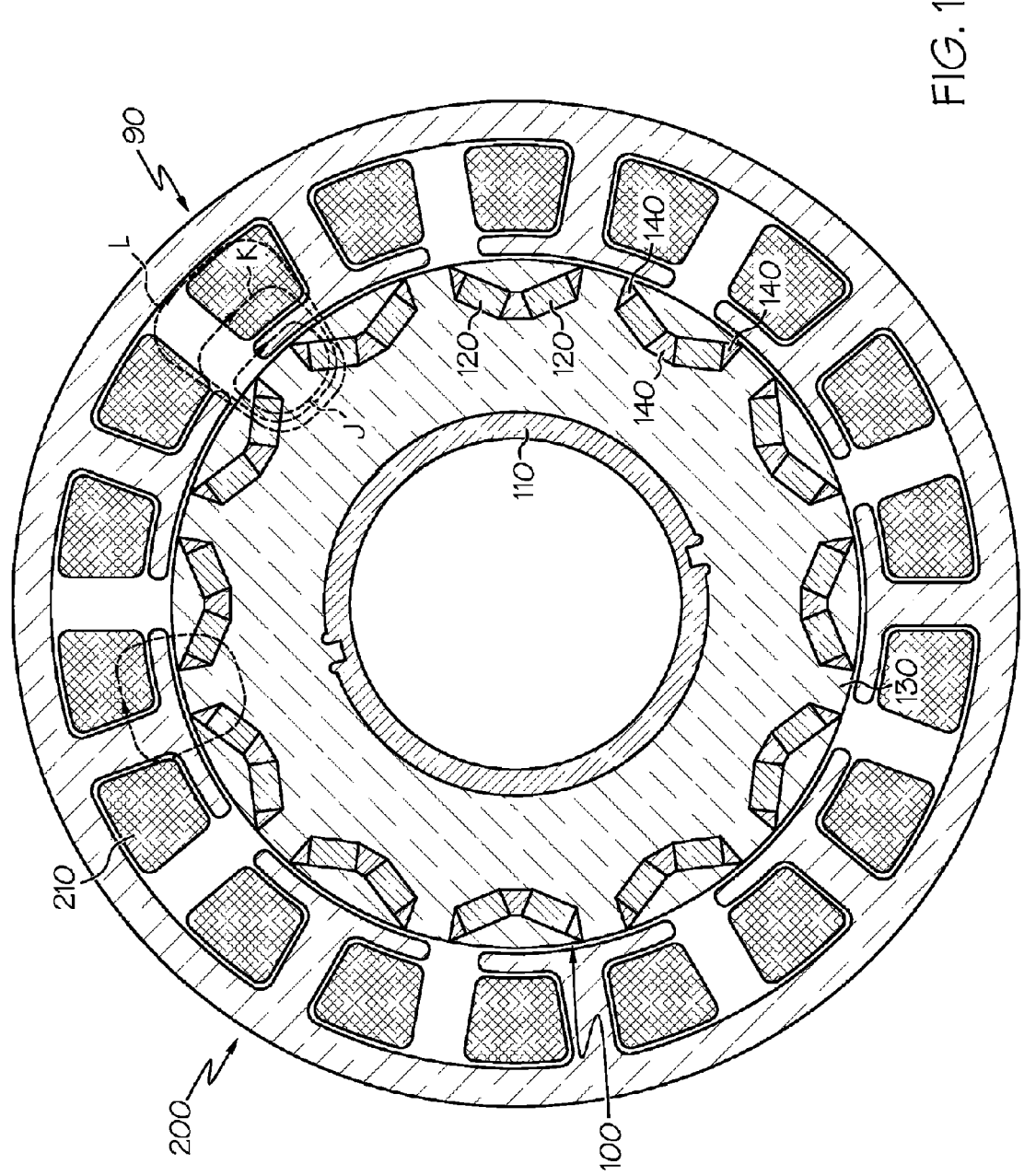
FIG. 1 schematically depicts a sectional view of an electric motor according to one or more embodiments shown and described herein.

FIG. 1 generally depicts one embodiment of a permanent magnet rotor having non-magnetic bridge portions. The rotor may include a spindle, sintered permanent magnets arranged around the spindle, soft magnetic material that partially surrounds the sintered permanent magnets, and a plurality of discrete regions of non-magnetic material that partially surrounds the sintered permanent magnets. As used herein, the term "soft magnetic material" refers to materials that are susceptible to magnetic fields but the ferromagnetic nature of the material only appears after an external magnetic field is applied. A soft magnetic material generally has a low coercivity, meaning that the material is easily demagnetized, in contrast with a "hard magnetic material" that has a high coercivity and retains magnetization. As used herein, the term "non-magnetic material" refers to a material that has a relative magnetic permeability less than about $1.2567 \times 10^{-6}$ Henry/meter, and are generally not susceptible to magnetic fields. The sintered permanent magnets may be embedded within the rotor itself. The discrete regions of non-magnetic material may be located in the bridge portions of the rotor, or locations extending from the sintered permanent magnet locations to the outer diameter of the rotor. The discrete regions of non-magnetic material may also be located in interior zones of the rotor, for example between opposite magnetic poles on adjacent sintered permanent magnets. In these locations, the non-magnetic material may be used to shape the magnetic fields so as to reduce flux leakage from magnetic poles on adjacent sintered permanent magnets. The reduction in flux leakage from adjacent sintered permanent magnets may increase the magnetic flux that the rotor directs into a surrounding stator, and therefore may improve the efficiency of an electric motor using such a rotor.

Figure 2:
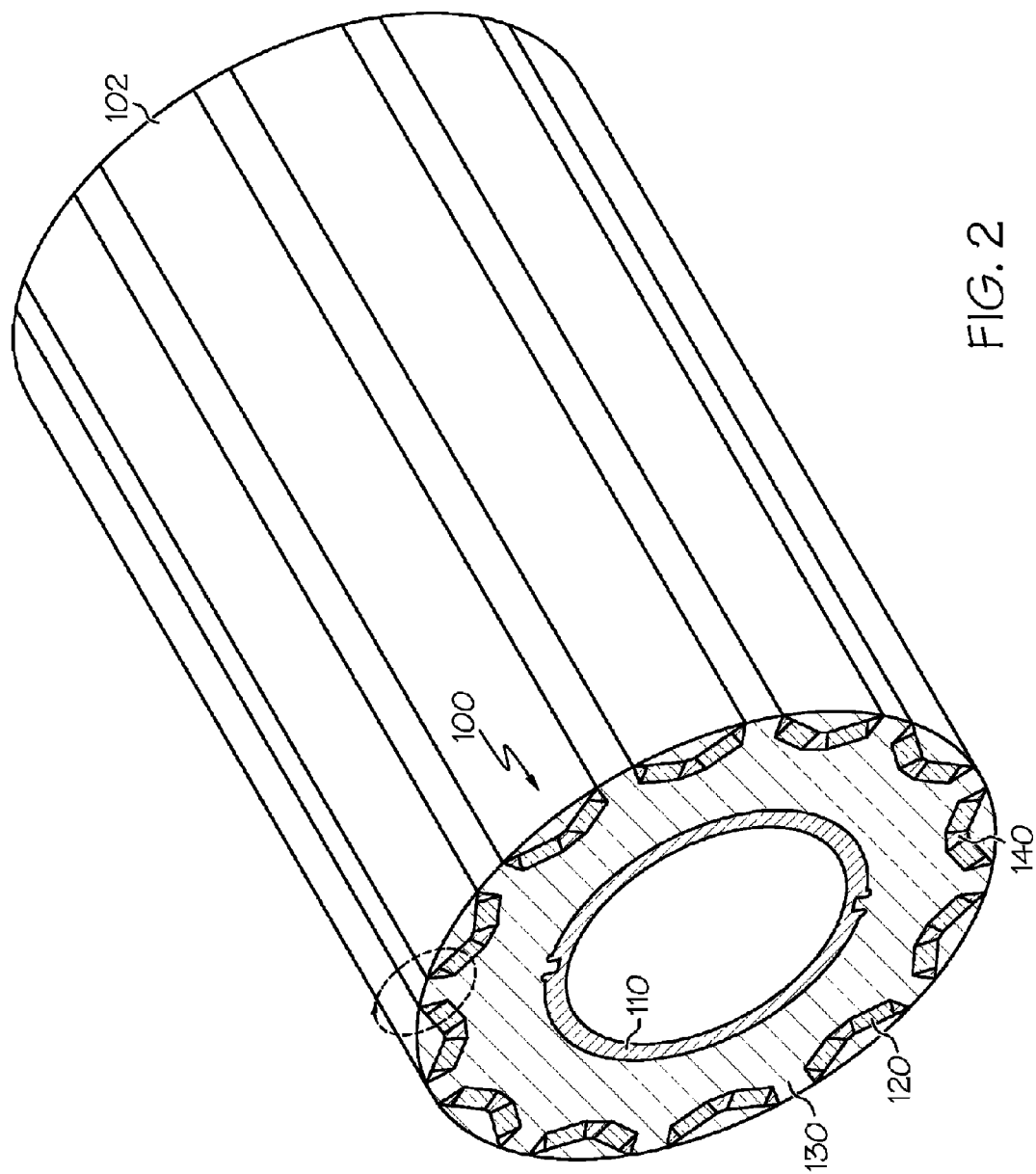
FIG. 2 schematically depicts a sectional view of a permanent magnet rotor according to one or more embodiments shown and described herein.

Referring to FIGS. 1 and 2, a permanent magnet rotor 100 includes a spindle 110 and a plurality of sintered permanent magnets 120 arranged around the spindle 110. Soft magnetic material 130 at least partially surrounds the sintered permanent magnets 120 and discrete regions of non-magnetic material 140 at least partially surrounds the sintered permanent magnets 120. In one embodiment, the sintered permanent magnets 120 extend continuously along an axial length of the permanent magnet rotor 100. In another embodiment (not shown), the sintered permanent magnets 120 extend discontinuously (e.g., as multiple segments) along an axial length of the permanent magnet rotor 100. The soft magnetic material 130 and the discrete regions of non-magnetic material 140 form an outer diameter 102 of the permanent magnet rotor 100. The sintered permanent magnets 120 generate localized magnetic fields at a plurality of locations around the permanent magnet rotor 100, illustrated by paths "J," "K," and "L."

In one embodiment, the permanent magnet rotor 100 is placed within an interior of a stator 200 as shown in FIGS. 1 and 2. The stator 200 includes windings 210 that are made from electrically conductive material. In one embodiment, an electrical current is passed through the windings 210 so that the electrical current creates a magnetic field in the stator 200. The electrical current may be an alternating electrical current that creates a rotating magnetic field, where the frequency of the alternating electrical current corresponds with the rate of rotation of the magnetic field. The rotating magnetic field generated in the stator interacts with the localized magnetic fields at a plurality of locations around the permanent magnet rotor 100 to apply a torque to the permanent magnet rotor 100. The application of the torque to the permanent magnet rotor 100 causes the permanent magnet rotor 100 to rotate at about the same rate that the rotating magnetic field rotates about the stator 200. The amount of torque applied to the permanent magnet rotor 100 by the stator 200 is approximately proportional to the amount of voltage and current passed through the windings 210. The spindle 110 of the permanent magnet rotor 100 may be coupled with a torque consuming device, for example, an input shaft of an automobile transmission, such as when the permanent magnet rotor 100 and the stator 200 act as an alternating current synchronous electric motor 90 of an electric vehicle.

In another embodiment, the spindle 110 of the permanent magnet rotor 100 may be coupled with a torque producing device, for example an output shaft of an engine. In this embodiment, the torque producing device causes the permanent magnet rotor 100 to rotate within the stator 200. The localized magnetic fields created by the sintered permanent magnets 120 of the permanent magnet rotor 100 interact with the windings 210 of the stator to create an electrical current that passes through the windings 210. In this embodiment, the permanent magnet rotor 100 and the stator 200 act as a generator, producing an electrical current, where the magnitude of the current is approximately proportional to the torque applied to the permanent magnet rotor 100.

Figure 3:
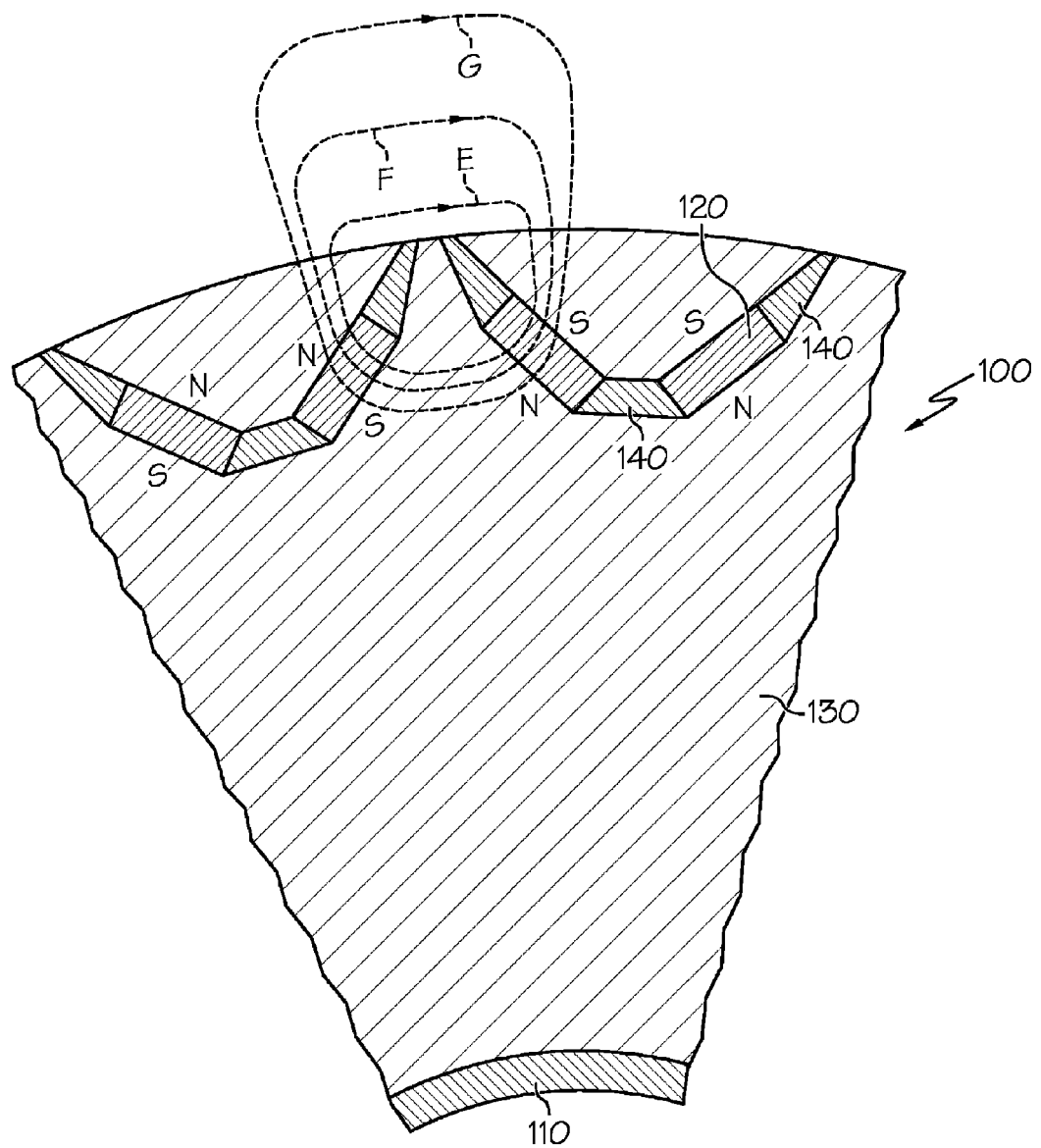
FIG. 3 schematically depicts a detailed sectional view of a permanent magnet rotor according to one or more embodiments shown and described herein.

In the embodiments described herein, the sintered permanent magnets 120 are embedded in the soft magnetic material 130 and the discrete regions of non-magnetic material 140 of the permanent magnet rotor 100, as depicted in FIG. 3. By embedding the sintered permanent magnets 120 inside the permanent magnet rotor 100, the sintered permanent magnets 120 may be positioned and located in a variety of different configurations. The sintered permanent magnets 120 are positioned and arranged relative to one another during formation of the permanent magnet rotor 100 to change the localized magnetic fields around the outer diameter 102 of the permanent magnet rotor 100. For example, by positioning and orienting sintered permanent magnets 120 near one another, the magnetic fields created by proximate sintered permanent magnets 120 may interact with one another to create a stronger magnetic field than had a single sintered permanent magnet been used. As depicted by paths "E," "F," and "G," magnetic flux created at one of these interaction zones may "travel" from the north pole of one sintered permanent magnet 120 to the south pole of the adjacent sintered permanent magnet 120.

The strength and orientation of this magnetic flux may be "tuned" at the time of manufacture by modifying the orientation of the sintered permanent magnets 120 within the permanent magnet rotor 100. For example, the distance between the sintered permanent magnets 120 and the angular orientation of the sintered permanent magnets 120 may be adjusted to tune the magnetic flux between adjacent sintered permanent magnets 120. As clearly depicted in FIGS. 3 and 5, the sintered permanent magnets 120 are positioned in a tilted orientation away from a radial orientation. In the depicted embodiment, the poles of a first sintered permanent magnet and a second sintered permanent magnet that are positioned proximate to the outer diameter 102 of the permanent magnet rotor 100 are spaced closer than the poles of the first and second sintered permanent magnets that are positioned proximate to the spindle 110. This tilted arrangement may control the direction of magnetic flux through the permanent magnet rotor 100. Additionally, sintered permanent magnets 120 may be located and arranged within the permanent magnet rotor 100 such that adjacent poles match (i.e., a north pole placed next to a north pole; a south pole placed next to a south pole). While magnetic flux may not travel outside of the permanent magnet rotor 100 between these pole locations, these sintered permanent magnets may further "tune" the magnetic flux of the permanent magnet rotor 100.

The intensity of the magnetic field at various points may be illustrated by a series of flux paths, for example paths "E," "F," and "G." The paths qualitatively represent the orientation and strength of the magnetic field that surrounds the poles of the sintered permanent magnets 120. Points lying along a given flux path have a constant magnetic flux. Because the strength of the magnetic field decreases at locations further away from the sintered permanent magnets 120, paths further from the poles of the sintered permanent magnets 120 (i.e., path "F" with respect to path "E;" path "G" with respect to path "F") represent regions of lower magnetic field strength, or lower magnetic flux density.

Figure 4:
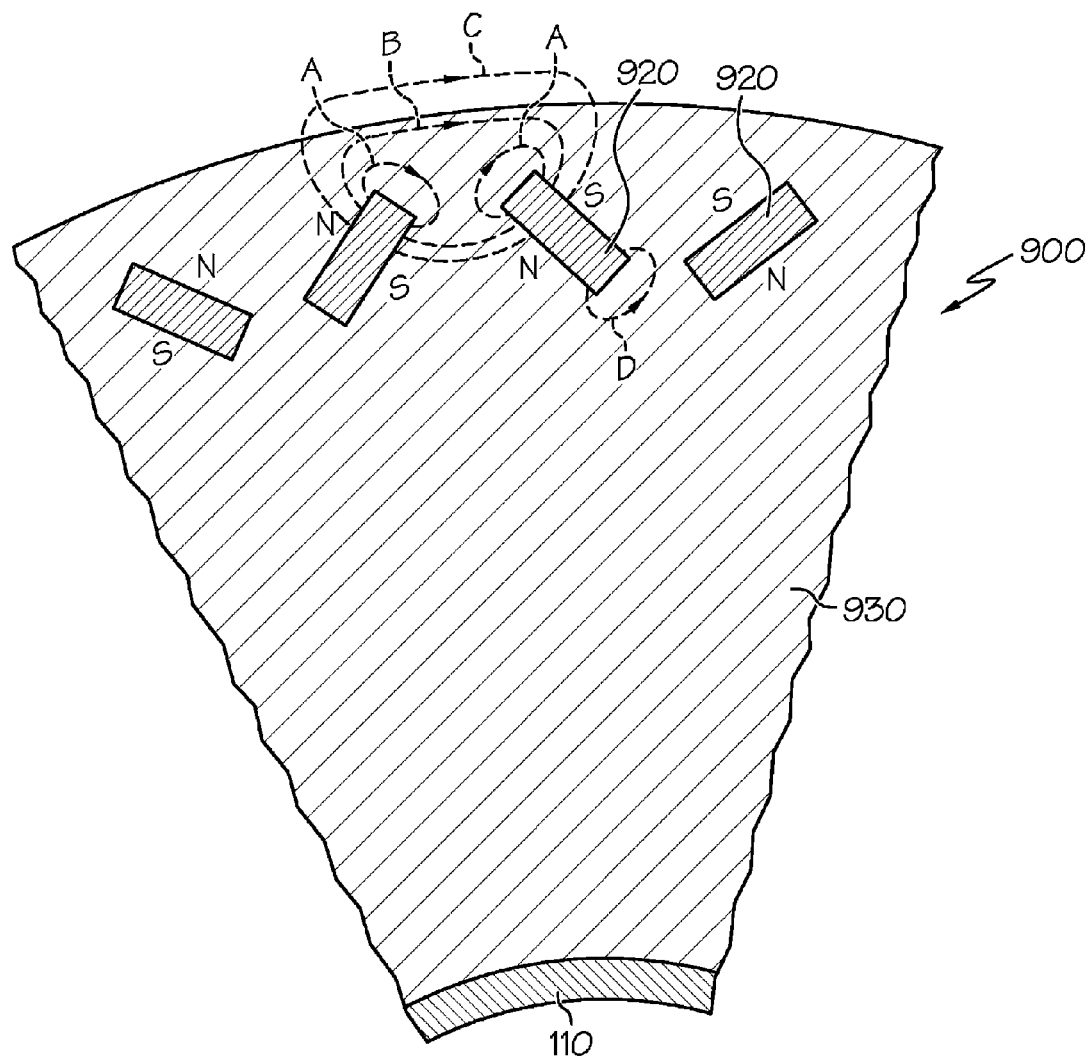
FIG. 4 schematically depicts a detailed sectional view of a permanent magnet rotor according to one or more embodiments shown and described herein.

Referring now to FIG. 4, a non-inventive example of a permanent magnet rotor 900 without discrete regions of non-magnetic material is depicted. Magnetic flux may travel from one pole of a permanent magnet 920 to the other (as illustrated by path "A") and from one permanent magnet to an adjacent permanent magnet 920 (as illustrated by path "B") travelling only through the bridge locations 904 of the rotor 900. These paths of magnetic flux represent "leakage" magnetic flux that does not assist with applying torque to the rotor 900 because the magnetic flux is not driven into a surrounding stator (not shown). Additionally, because the leakage flux is positioned a short distance from the permanent magnets 920, this leakage flux may have a high flux density. Therefore, the magnetic flux that travels outside of the rotor 900 (as illustrated by path "C"), may have a low flux density.

Figure 5:
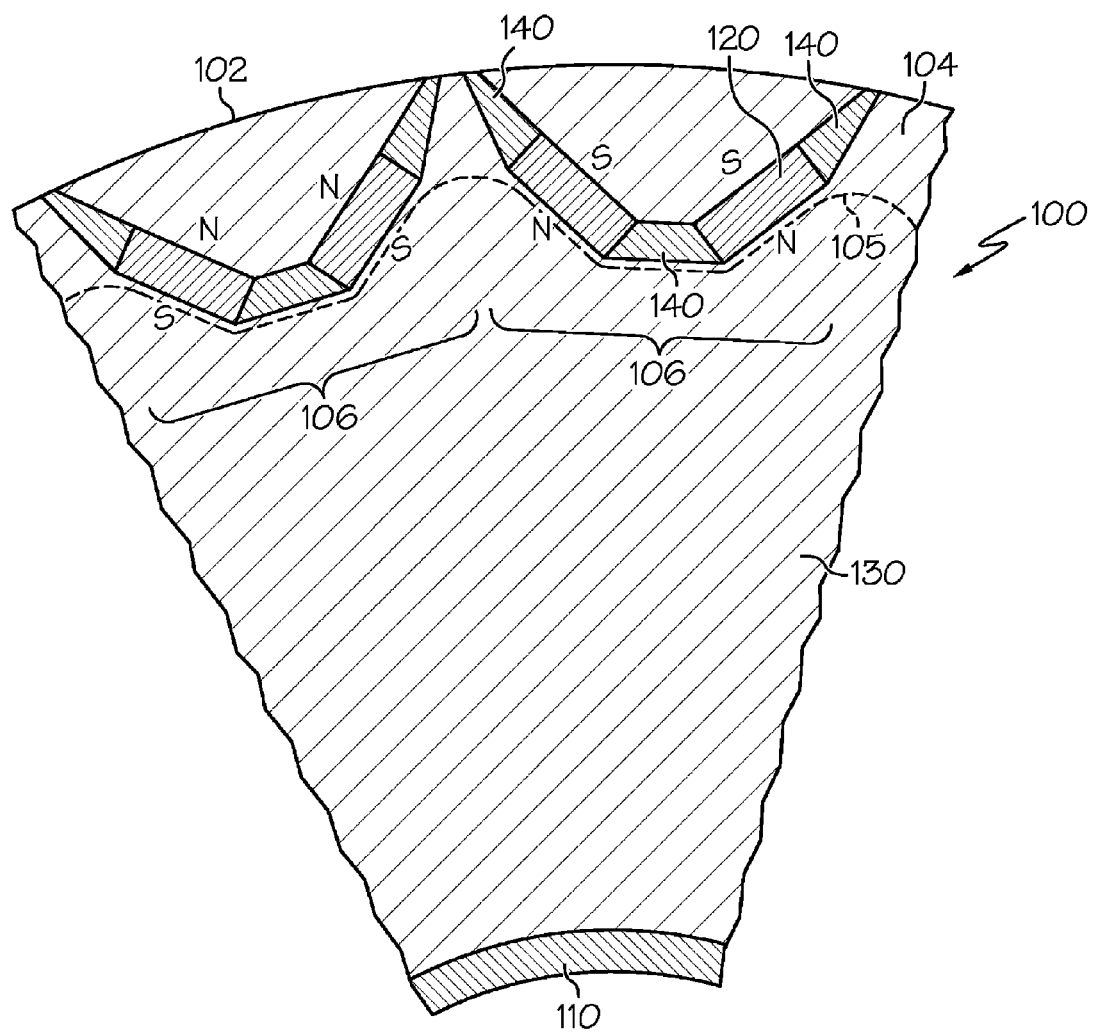
FIG. 5 schematically depicts a detailed sectional view of a permanent magnet rotor according to one or more embodiments shown and described herein.

Referring to FIG. 5, locations of the permanent magnet rotor 100 between the sintered permanent magnets 120 to the outer diameter 102 of the permanent magnet rotor 100 may be referred to as "bridge" locations 104 (i.e., the region of the permanent magnet rotor 100 from outside the dashed line 105 to the outer diameter 102). Material in the bridge locations 104 provides mechanical support to the sintered permanent magnets 120. Mechanical support of the sintered permanent magnets 120 is important to resist the mechanical forces created by the rotation of the permanent magnet rotor 100. Increased mechanical support may be required as the maximum operating speed of the permanent magnet rotor 100 increases, corresponding with an increase in the outward inertial force applied to the sintered permanent magnets 120.

To prevent magnetic flux from leaking through the bridge locations 104 of the permanent magnet rotor 100, the sintered permanent magnets 120 are at least partially surrounded by discrete regions of non-magnetic material 140 in the bridge locations 104. The discrete regions of non-magnetic material 140 in the bridge locations 104 prevent magnetic flux from traveling from adjacent sintered permanent magnets 120 through the bridge location 104 (i.e., flux paths "E," "F," and "G" depicted in FIG. 3). By preventing this leakage flux, the discrete regions of non-magnetic material 140 cause more magnetic flux to be directed into the stator 200 and the windings 210 than a rotor that does not have discrete regions of non-magnetic material 140 in the bridge locations 104 (i.e., a rotor such as that depicted in FIG. 4). Further, because the initial flux path occurs outside of the outer diameter 102 of the permanent magnet rotor 100, subsequent flux paths are directed further into the stator 200 and the windings 210. Thus, the overall magnetic flux density of the permanent magnet rotor 100 is increased.

In one embodiment of the permanent magnet rotor 100, the sintered permanent magnets 120 are at least partially surrounded by soft magnetic material 130 and at least partially surrounded by discrete regions of non-magnetic material 140 along the interior of the permanent magnet rotor 100, or in interior zones 106 between proximate sintered permanent magnets 120, as depicted in FIG. 5. As illustrated by path "D" in FIG. 4, a permanent magnet rotor 900 that does not have discrete regions of non-magnetic material in the interior zones may allow magnetic flux to travel directly from the north pole of one permanent magnet 920 to the south pole of the same permanent magnet 920. By constructing a permanent magnet rotor 100 with non-magnetic material 140 in interior zones 106, as depicted by FIGS. 1-3, and 5, the magnetic field surrounding the interior poles of the sintered permanent magnets 120 can be tuned to further improve the efficiency of the permanent magnet rotor 100.

As described above in regard to FIG. 1, the magnetic fields created by passing a current through the windings 210 of the stator 200 interact with the localized magnetic fields created by the sintered permanent magnets 120 to provide a torque to the permanent magnet rotor 100. The strength of the localized magnetic fields created by the sintered permanent magnets 120 may affect the efficiency of the permanent magnet rotor 100 when operating as either a motor or a generator. For example, the discrete regions of non-magnetic material 140 in the bridge locations 104 and the interior zones 106 permit the permanent magnet rotor 100 to be "tuned" during manufacture to direct more magnetic flux into the adjacent windings 210 than a permanent magnet rotor that does not use discrete regions of non-magnetic material (i.e., permanent magnet rotor 900 depicted in FIG. 4). The increased efficiency provided by this tuned magnetic flux allows less current to be passed through the windings 210, creating a less powerful rotating magnetic field inside the stator 200, while maintaining the same amount of torque driving the permanent magnet rotor 100. Thus, a motor 90 using a permanent magnet rotor 100 that uses discrete regions of non-magnetic material 140 may have increased efficiency over a motor that uses a permanent magnet rotor without discrete regions of non-magnetic material.

A permanent magnet rotor 100, as depicted in FIG. 1, may be produced using powdered soft magnetic material and powdered non-magnetic material to form the soft magnetic material 130 and discrete regions of non-magnetic material 140, respectively, of the permanent magnet rotor 100. The powdered soft magnetic material and the powdered non-magnetic material are processed into a solid, integral permanent magnet rotor 100 by compaction. In one embodiment, the powders are mechanically compacted around the sintered permanent magnets 120 using a mechanical press that compacts the powders in a frame, such as a die or mold. The dies may have cut-outs in certain sections to allow for compaction of the powders without disturbing the location of the sintered permanent magnets 120. Mechanical compaction may be axial or radial. In another embodiment, the components may be compacted using an isostatic pressing operation. An isostatic pressing operation subjects the powders to a gas at an elevated pressure that compacts and solidifies the powders into an integral shape. The isostatic pressing operation may be "hot" (i.e., performed at an elevated temperature) or "cold" (i.e., performed at room temperature). The gas used in the isostatic pressing operation may be inert so as not to react with the powders during compaction. In yet another embodiment, the powders and the sintered permanent magnets 120 may be compacted using an electromagnetic compaction. One example of a system capable of performing the electromagnetic compaction process is the Magnepress® System from IAP Research, Inc. of Dayton, Ohio.

Figure 6:
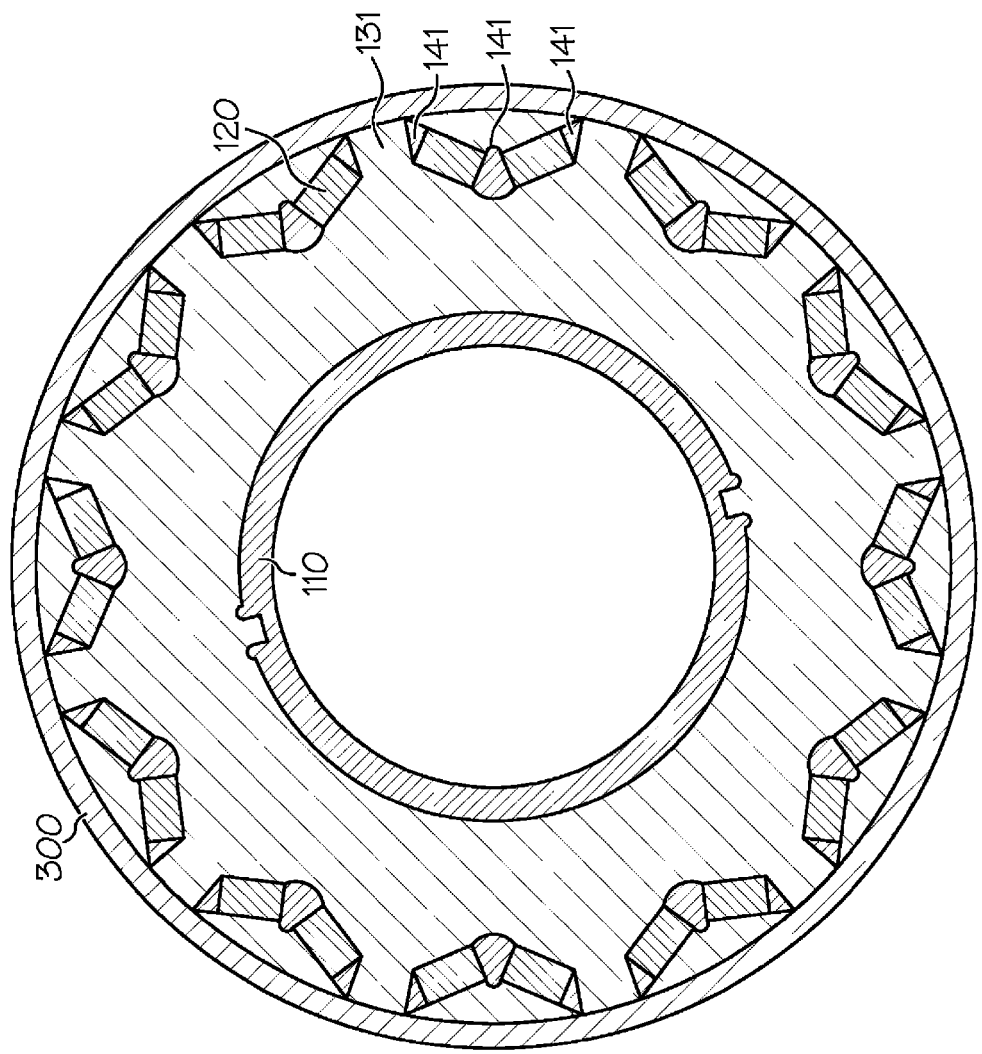
FIG. 6 schematically depicts a sectional view of a permanent magnet rotor according to one or more embodiments shown and described herein.
Figure 7:
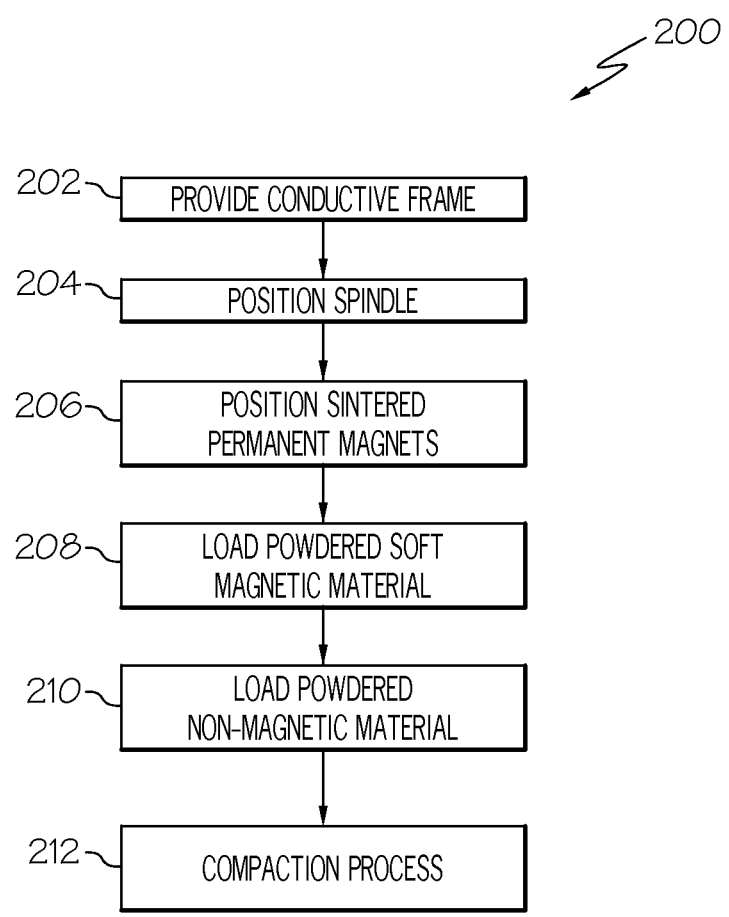
FIG. 7 schematically depicts a process for manufacturing a permanent magnet rotor according to one or more embodiments shown and described herein.

As depicted in FIG. 6 in a process 200 schematically described in FIG. 7, a frame 300 is provided at step 202. At step 204, a spindle 110 is inserted 204 inside the frame 300. A plurality of sintered permanent magnets 120 are then arranged inside the frame 300 and arranged around the spindle 110 in a pre-determined orientation in step 206. Powdered soft magnetic material 131 and powdered non-magnetic material 141 are then loaded into the frame 300 (at steps 208 and 210) such that the powdered soft magnetic material 131 at least partially surrounds the sintered permanent magnets 120 and such that the powdered non-magnetic material 141 at least partially surrounds the sintered permanent magnets 120. At step 212, these components are compacted to form an integral permanent magnet rotor 100.

A permanent magnet rotor 100 manufactured according to the described method may allow for dissimilar materials to be simultaneously compacted with one another to produce an integral permanent magnet rotor 100 that is resilient and resistant to mechanical forces applied in operation. The soft magnetic material 130 includes a first material and the non-magnetic material 140 includes a second material with a composition different than the first material.

The permanent magnet rotors 100 described herein utilize sintered permanent magnets 120. In one embodiment, the sintered permanent magnets 120 are sintered neodymium magnets. In another embodiment, the sintered permanent magnets 120 are sintered samarium-cobalt magnets. Other materials for use in the sintered permanent magnets 120 are contemplated, including magnets formed from other rare-earth elements. Sintered permanent magnets 120 may produce a stronger magnetic field than other types of magnets, and therefore the efficiency of a permanent magnet rotor 100 having sintered permanent magnets 120 may be higher than the efficiency of a permanent magnet rotor 100 that does not use sintered permanent magnets 120.

In one embodiment, the sintered permanent magnets 120 may be coated. For example, in one embodiment, the sintered permanent magnets 120 may be plated on at least one side with nickel. In another embodiment, the sintered permanent magnets 120 may be coated on at least one side with a thermoplastic polymer. These coatings assist in preventing corrosion of the sintered permanent magnets 120.

In one embodiment, the soft magnetic material 130 is an electric steel. Such electric steels include iron alloys that contain from about 0 to about 6.5% silicon by weight. An increase in silicon is generally associated with a decrease in eddy current generation, or induced magnetic fields that oppose the charge of the original magnetic field. Thus, a decrease in eddy currents increases the performance of a permanent magnet rotor 100. However, an increase in the silicon content in steel generally corresponds with a decrease in the workability of the material, which may be required to produce laminates for a rotor by traditional methods. Thus, using a compaction process may allow for the fabrication of a permanent magnet rotor 100 using an electric steel that contains a higher amount of silicon than a rotor that uses laminates of electric steel.

In one embodiment, the powdered non-magnetic material 141 includes a stainless steel, for example a 300-series stainless steel. In another embodiment, the powdered non-magnetic material 141 includes nickel or an alloy thereof. In another embodiment, the powdered non-magnetic material 141 includes aluminum or an alloy thereof. In yet another embodiment, the powdered non-magnetic material 141 includes copper or an alloy thereof. In still another embodiment, the powdered non-magnetic material 141 includes a powdered ceramic material. In another embodiment, the powdered non-magnetic material 141 includes a thermoplastic polymer.

In yet another embodiment, the powdered non-magnetic material 141 may include a combination of powdered metals discussed above and thermoplastic polymer or a combination of powdered ceramic and thermoplastic polymer. The addition of thermoplastic polymer may further magnetically isolate the sintered permanent magnets 120 from the soft magnetic material 130 and the discrete regions of non-magnetic material 140.

It should be understood that other materials may be used as the discrete regions of non-magnetic material 140 of the permanent magnet rotor 100. For example, materials having lower magnetic permeability may create permanent magnet rotors 100 with increased efficiency. Materials having the required strength properties and an absolute magnetic permeability less than about $1.2567 \times 10^{-6}$ H/m may be used as the discrete regions of non-magnetic material 140.

In one embodiment of the permanent magnet rotor 100, the powdered soft magnetic material 131 and the powdered non-magnetic material 141 may include powdered materials having a mean particle diameter from about 0.1 micron to about 300 microns, for example, a mean particle diameter from about 1 to about 100 microns.

The materials used in the permanent magnet rotor 100 have sufficient strength at extended temperature ranges to accommodate motor 90 operation across a variety of environmental conditions. The ability to operate at an extended temperature range may allow for a large amount of electric current to be introduced to the motor 90 through the windings 210. The rotor may operate at a temperature range from less than about −40° C. to greater than about 200° C., for example a temperature range from less than about −40° C. to greater than about 800° C.

As described herein, the permanent magnet rotor 100 may be produced from powdered soft magnetic material 131 and powdered non-magnetic material 141. Because the base components of an unformed rotor are powders that may be compressed to form an integral permanent magnet rotor 100, some shifting and co-mingling of the powders may be expected. As depicted in FIG. 6, powdered soft magnetic material 131 and powdered non-magnetic material 141 may be loaded into the frame in a first orientation, and after compaction, the soft magnetic material 130 and the non-magnetic material may take a second orientation (i.e., the orientation depicted in FIG. 1). Additionally, the concentrations of powdered soft magnetic material 131 in the compacted soft magnetic material 130 and the concentration of powdered non-magnetic material 141 in the discrete regions of compacted non-magnetic material 140 may vary depending on location. Therefore, in some embodiments a discrete region of non-magnetic material may be defined as a region wherein the concentration of the non-magnetic material is greater than about 20%. In other embodiments, a discrete region of non-magnetic material may be defined as a region wherein the concentration of the non-magnetic material is greater than about 30%. In other embodiments, a discrete region of non-magnetic material may be defined as a region wherein the concentration of the non-magnetic material is greater than about 40%. In other embodiments, a discrete region of non-magnetic material may be defined as a region wherein the concentration of the non-magnetic material is greater than about 50%. In other embodiments, a discrete region of non-magnetic material may be defined as a region wherein the concentration of the non-magnetic material is greater than about 60%. In other embodiments, a discrete region of non-magnetic material may be defined as a region wherein the concentration of the non-magnetic material is greater than about 70%. In other embodiments, a discrete region of non-magnetic material may be defined as a region wherein the concentration of the non-magnetic material is greater than about 80%. In other embodiments, a discrete region of non-magnetic material may be defined as a region wherein the concentration of the non-magnetic material is greater than about 90%. In other embodiments, a discrete region of non-magnetic material may be defined as a region wherein the concentration of the non-magnetic material is greater than about 95%. In other embodiments, a discrete region of non-magnetic material may be defined as a region wherein the concentration of the non-magnetic material is greater than about 98%. In other embodiments, a discrete region of non-magnetic material may be defined as a region wherein the concentration of the non-magnetic material is greater than about 99%. This shifting and co-mingling of powders may increase the strength of the interfaces between the soft magnetic material 130 and the discrete regions of non-magnetic material 140 as compared to a rotor where no co-mingling of adjacent materials occurs.

After compacting the powdered soft magnetic material 131 and the powdered non-magnetic material 141 about the spindle 110 and the sintered permanent magnets 120, the permanent magnet rotor 100 is formed into an integral unit. Depending on the parameters and type of compaction method used to manufacture the permanent magnet rotor 100, the resulting part may be net-shaped or near-net-shaped (i.e., formed such that the dimensions of the part, upon removal from the frame 300 match or nearly match the required finished part dimensions, and therefore require no or minimal post-compaction processing).

Although the powder materials are solidified into a single part, the microstructure of the soft magnetic material 130 and the discrete regions of non-magnetic material 140 may continue to exhibit visual and/or mechanical properties that indicate that the permanent magnet rotor 100 was produced from powdered materials. For example, a permanent magnet rotor 100 that is sectioned and visually inspected under magnification may show evidence in the microstructure that the soft magnetic material 130 and the discrete regions of non-magnetic material 140 of the permanent magnet rotor 100 were formed from powders. Further, the mechanical properties of the permanent magnet rotor 100, for example, the density of the compacted soft magnetic material 130 and the discrete regions of compacted non-magnetic material 140 may be less than the density of a rolled sheet having the same chemical composition. Additionally, the yield strength and the ultimate tensile strength of the compacted soft magnetic material 130 and the compacted non-magnetic material 140 may less than the yield strength and the ultimate tensile strength of a rolled sheet having the same chemical composition.

The compaction process may eliminate the need for a post-cure or a post-sinter step after the powdered materials have been compacted into a permanent magnet rotor 100. This lack of post-processing may contributed to increased dimensional accuracy of the permanent magnet rotor 100 immediately after removal from the conductive frame 300. The compaction process may create an increased temperature and pressure condition within the frame 300 that cures any powdered polymeric material. In one embodiment, the permanent magnet rotor 100 may include sintered permanent magnets 120 and unsintered soft magnetic material 130 and non-magnetic material 140.

By building rotors with discrete regions of non-magnetic material 140 in the bridge locations 104 and interior zones 106, the above-described permanent magnet rotor 100 may operate more efficiently than a permanent magnet rotor 900 that does not have discrete regions of non-magnetic material in the bridge locations 104 or the interior zones 106. By compacting powdered materials around the sintered permanent magnets 120, a permanent magnet rotor 100 may have non-magnetic material placed to prevent leakage of magnetic flux from adjacent sintered permanent magnets 120, while maintaining sufficient strength in bridge locations 104 to resist mechanical forces associated with the rotation of the permanent magnet rotor 100.

It should now be understood that permanent magnet rotors may include sintered permanent magnets, soft magnetic material at least partially surrounding the sintered permanent magnets, and non-magnetic material at least partially surrounding the sintered permanent magnets. The permanent magnet rotors be formed having non-magnetic material in the bridge locations of the rotors. This non-magnetic material may increase the magnetic flux of the rotor and may improve efficiency of an electric motor that uses such a permanent magnet rotor. Such a permanent magnet rotor may be formed using a dynamic magnetic compaction process.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A rotor for an electrical motor, comprising:
   a spindle;
   a plurality of sintered permanent magnets arranged around the spindle;
   an unsintered compacted powdered soft magnetic material at least partially surrounding the plurality of sintered permanent magnets; and
   a plurality of discrete regions of unsintered compacted powdered non-magnetic material at least partially surrounding the plurality of sintered permanent magnets, the plurality of discrete regions of non-magnetic material being at least partially embedded in the soft magnetic material, wherein the soft magnetic material and the plurality of discrete regions of non-magnetic material couple the plurality of sintered permanent magnets with the spindle.

2. The rotor of claim 1, wherein the soft magnetic material comprises a first material and the non-magnetic material comprises a second material with a composition different than that of the first material.

3. The rotor of claim 1, wherein the soft magnetic material forms at least a portion of an outer diameter of the rotor and at least one of the plurality of discrete regions of non-magnetic material form at least a portion of the outer diameter of the rotor.

4. The rotor of claim 1, wherein the plurality of discrete regions of non-magnetic material inhibit magnetic flux from leaking from a first sintered permanent magnet to a second sintered permanent magnet that is adjacent to the first sintered permanent magnet.

5. The rotor of claim 4, wherein a first discrete region of non-magnetic material is arranged at a first bridge location extending from the first sintered permanent magnet to an outer diameter of the rotor, and a second discrete region of non-magnetic material is arranged at a second bridge location extending from the second sintered permanent magnet to the outer diameter of the rotor.

6. The rotor of claim 5, wherein the first sintered permanent magnet and the second sintered permanent magnet are positioned in a tilted orientation away from a radial orientation such that poles of the first sintered permanent magnet and the second sintered permanent magnet that are positioned proximate to the outer diameter of the rotor are spaced closer than the poles of the first sintered permanent magnet and the second sintered permanent magnet positioned proximate to the spindle, and the first sintered permanent magnet and the second sintered permanent magnet are oriented such that the polarity of the adjacent poles of the first sintered permanent magnet and the second sintered permanent magnet are reversed.

7. The rotor of claim 4, wherein one of the plurality of discrete regions of non-magnetic material is arranged in an interior zone extending from the first sintered permanent magnet to the second sintered permanent magnet.

8. The rotor of claim 1, wherein the soft magnetic material comprises a ferrous alloy comprising silicon.

9. The rotor of claim 1, wherein the plurality of discrete regions of non-magnetic material comprise a ferrous alloy comprising nickel.

10. The rotor of claim 1, wherein the plurality of discrete regions of non-magnetic material comprise thermoplastic polymer.

11. The rotor of claim 1, wherein the plurality of discrete regions of non-magnetic material comprise an aluminum alloy.

12. The rotor of claim 1, wherein the plurality of discrete regions of non-magnetic material comprise a material having an absolute magnetic permeability less than $1.2567 \times 10^{-6}$ H/m.

13. An alternating current synchronous electric motor comprising:
   a stator comprising a plurality of windings;
   a rotor arranged to rotate within an interior of the stator, the rotor comprising:
      a spindle;
      a plurality of sintered permanent magnets arranged around the spindle;
      an unsintered compacted powdered soft magnetic material at least partially surrounding the plurality of sintered permanent magnets; and
      a plurality of discrete regions of unsintered compacted powdered non-magnetic material at least partially surrounding the plurality of sintered permanent magnets, wherein the soft magnetic material and the plurality of discrete regions of non-magnetic material couple the plurality of sintered permanent magnets with the spindle, and
   wherein the plurality of sintered permanent magnets create a plurality of localized magnetic fields that interact with an alternating electrical current that passes through the plurality of windings of the stator.

14. The electric motor of claim 13, wherein the soft magnetic material comprises a first material and the non-magnetic material comprises a second material, the soft magnetic material and the non-magnetic material are simultaneously compacted about the sintered permanent magnets and the spindle to form the rotor.

15. The electric motor of claim 13, wherein the plurality of discrete regions of non-magnetic material inhibit magnetic flux from leaking from a first sintered permanent magnet to a second sintered permanent magnet.

16. The electric motor of claim 15, wherein a first discrete region of non-magnetic material is arranged at a first bridge location extending from the first sintered permanent magnet to an outer diameter of the rotor, and a second discrete region of non-magnetic material is arranged at a second bridge location extending from the second sintered permanent magnet to the outer diameter of the rotor.

17. The rotor of claim 16, wherein the first sintered permanent magnet and the second sintered permanent magnet are positioned in a tilted orientation away from a radial orientation such that poles of the first sintered permanent magnet and the second sintered permanent magnet that are positioned proximate to the outer diameter of the rotor are spaced closer than the poles of the first sintered permanent magnet and the second sintered permanent magnet positioned proximate to the spindle, and the first sintered permanent magnet and the second sintered permanent magnet are oriented such that the polarity of the adjacent poles of the first sintered permanent magnet and the second sintered permanent magnet are reversed.

18. The electric motor of claim 15, wherein one of the plurality of discrete regions of non-magnetic material is arranged in an interior zone extending from the first sintered permanent magnet to the second sintered permanent magnet.

* * * * *